(No Model.)  7 Sheets—Sheet 1.

W. F. BROWNE.

PROCESS OF AND MEANS FOR MANUFACTURING A HEATING FUEL FOR BURNING LIME, &c.

No. 263,310. Patented Aug. 29, 1882.

Witnesses:—

Inventor:—

(No Model.)  7 Sheets—Sheet 2.

W. F. BROWNE.

PROCESS OF AND MEANS FOR MANUFACTURING A HEATING FUEL FOR BURNING LIME, &c.

No. 263,310. Patented Aug. 29, 1882.

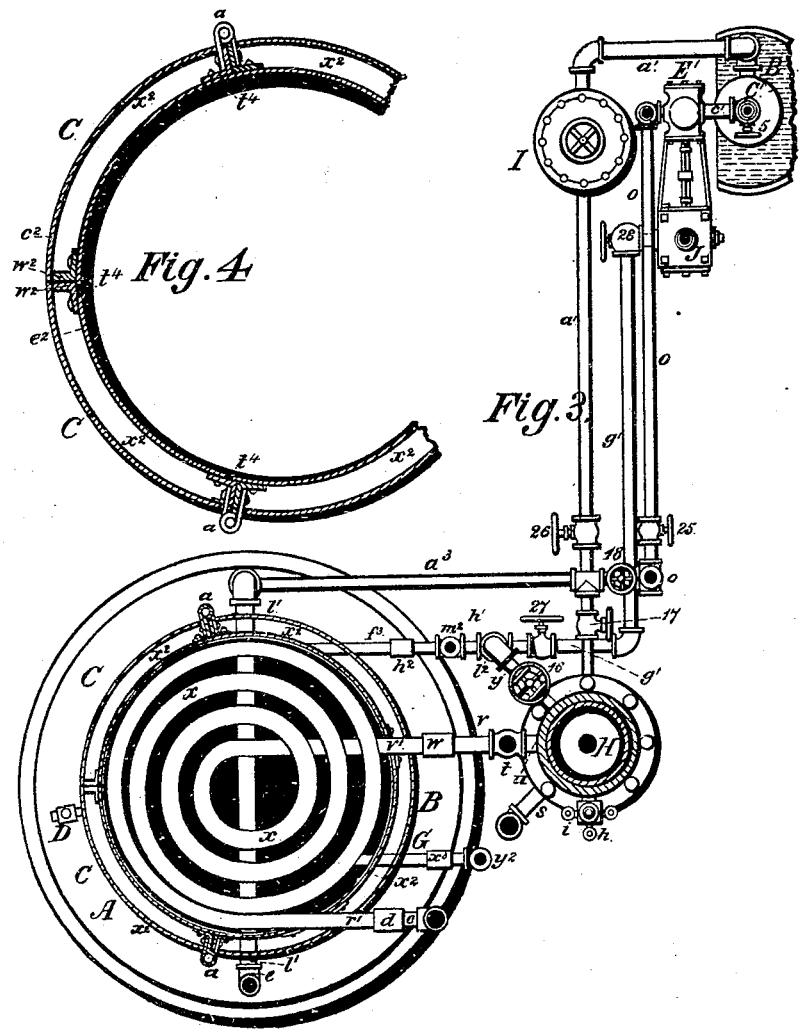

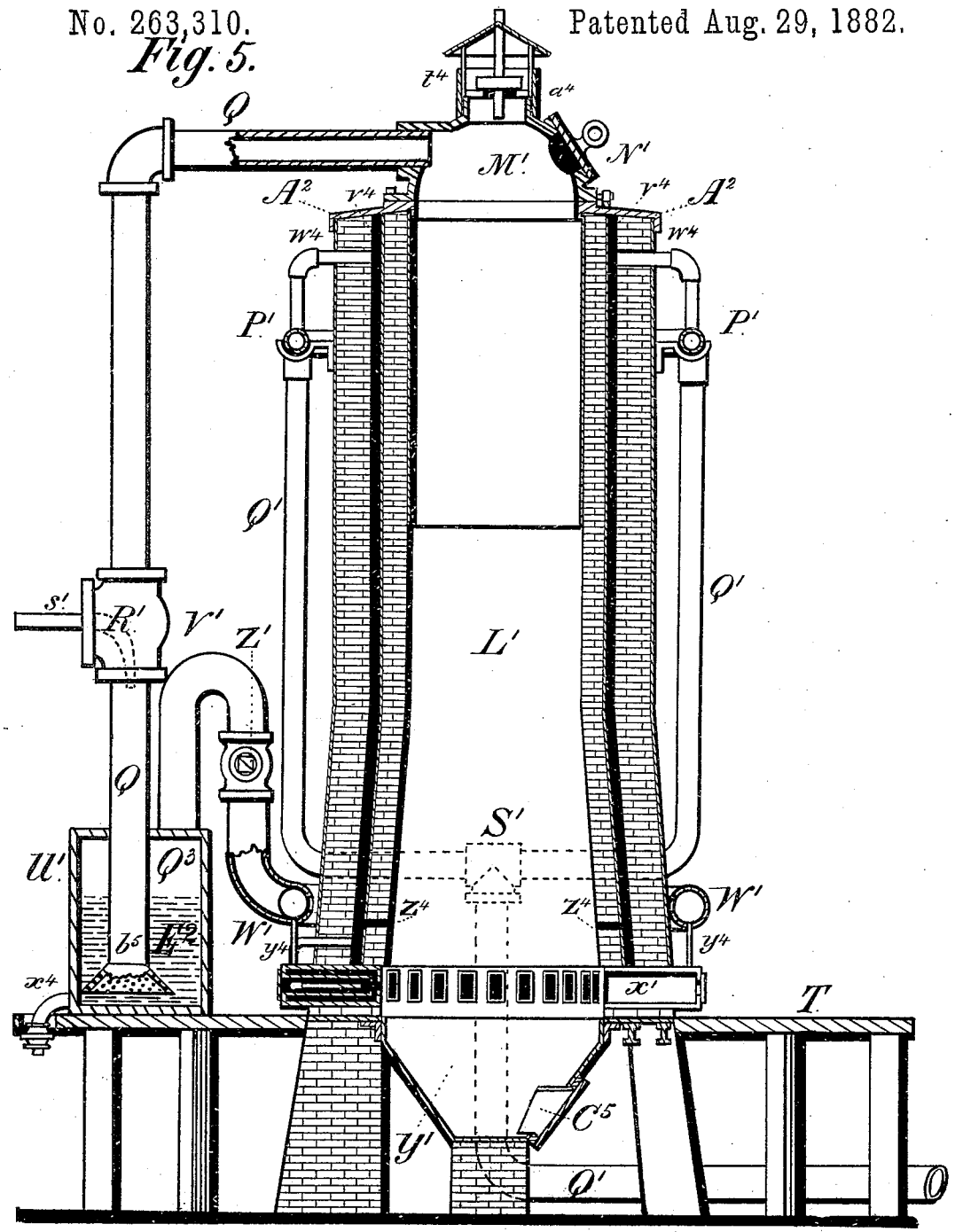

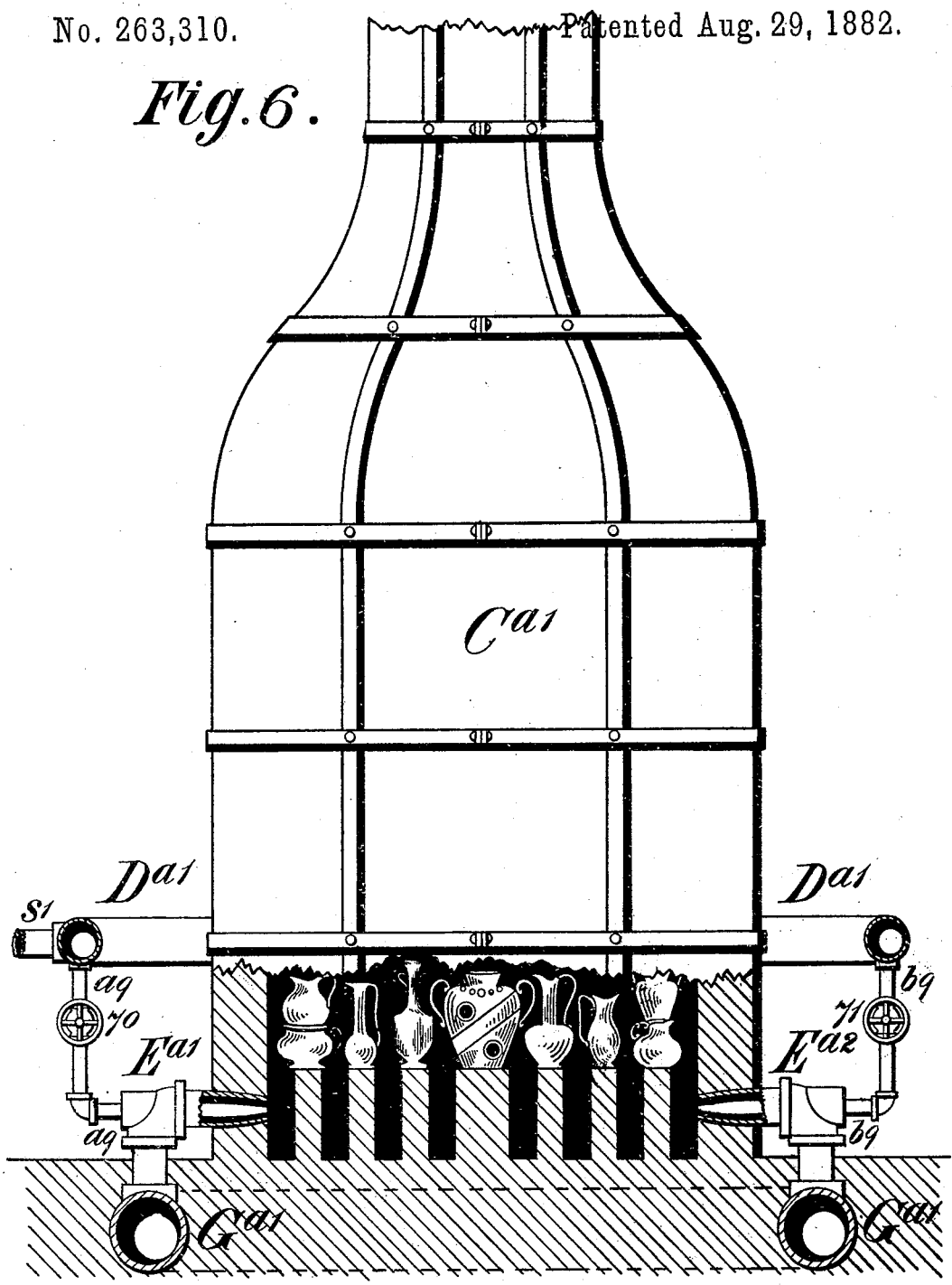

(No Model.) 7 Sheets—Sheet 6.
W. F. BROWNE.
PROCESS OF AND MEANS FOR MANUFACTURING A HEATING FUEL FOR BURNING LIME, &c.
No. 263,310. Patented Aug. 29, 1882.
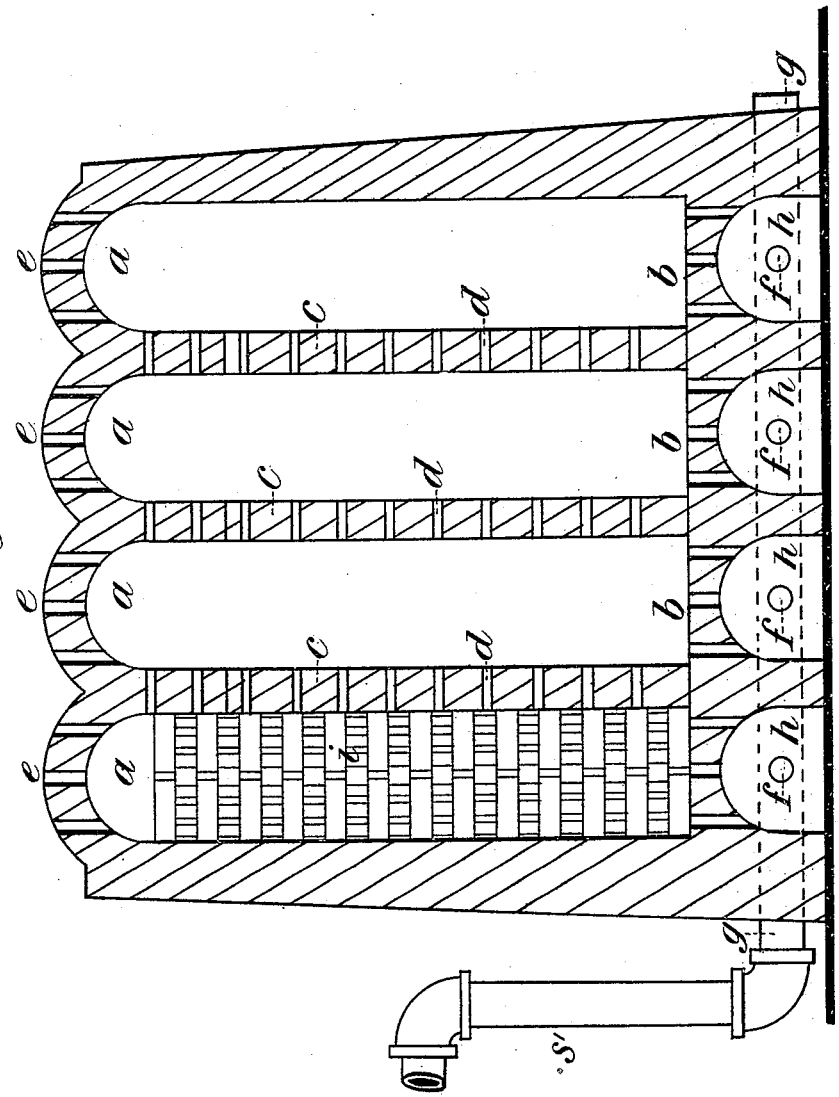
WITNESSES:
INVENTOR

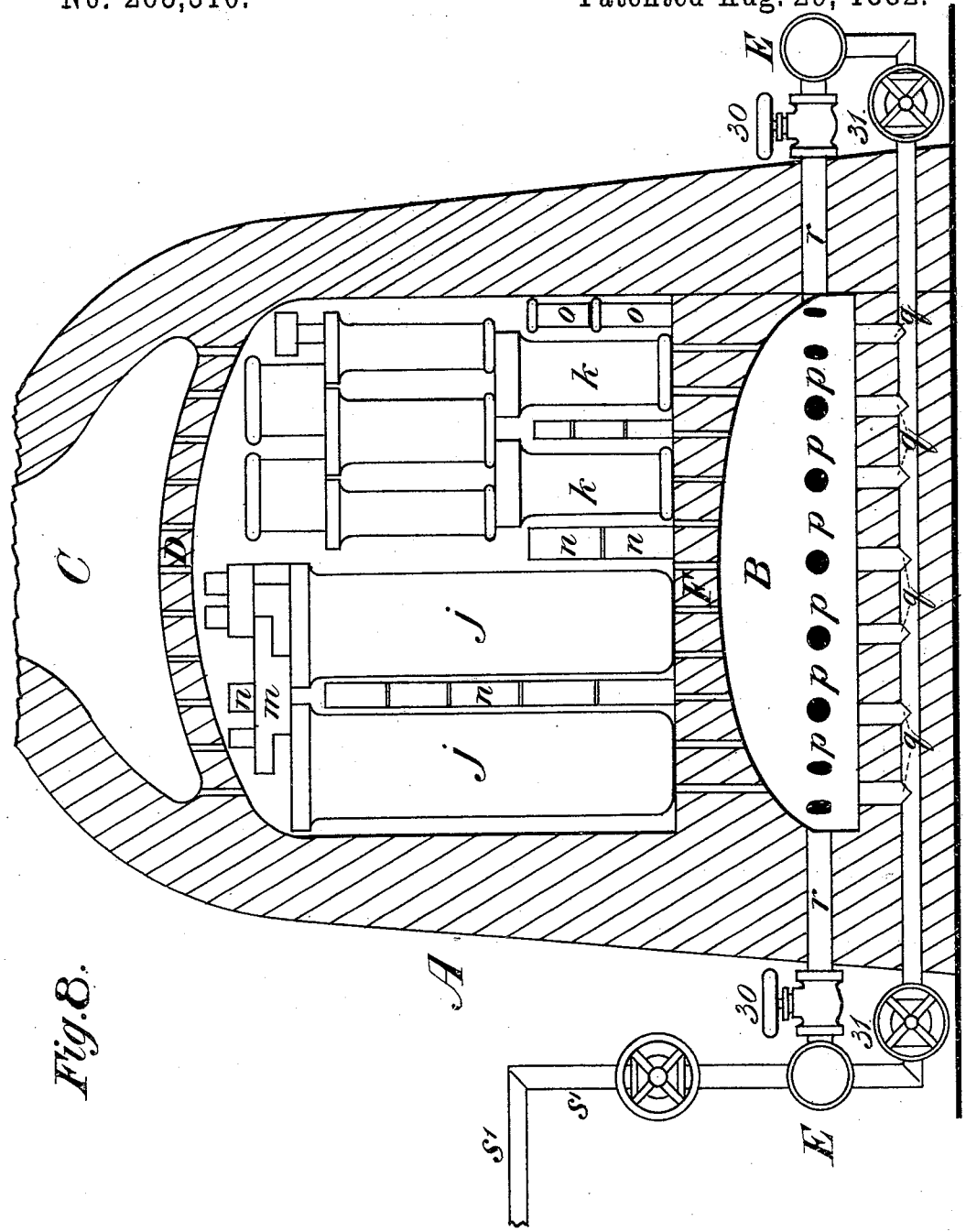

UNITED STATES PATENT OFFICE.

WILLIAM FRANK BROWNE, OF NEW YORK, N. Y.

PROCESS OF AND MEANS FOR MANUFACTURING A HEATING-FUEL FOR BURNING LIME, &c.

SPECIFICATION forming part of Letters Patent No. 263,310, dated August 29, 1882.

Application filed December 22, 1881. (No model.)

*To all whom it may concern:*

Be it known that I, WILLIAM FRANK BROWNE, of the city, county, and State of New York, have invented a new and useful Improvement in Process of Burning Lime, Pottery, &c., and supplying fuel therefor; and I do hereby declare that the following is a clear and full description thereof, reference being had to the accompanying drawings, which form a part of this specification.

This invention relates to a new process or method and to the means for making a gaseous fuel to be used in connection with all classes of furnaces and kilns wherein lime and articles manufactured from clay are burned, and also for calcining and vitrifying purposes.

Figure 1:
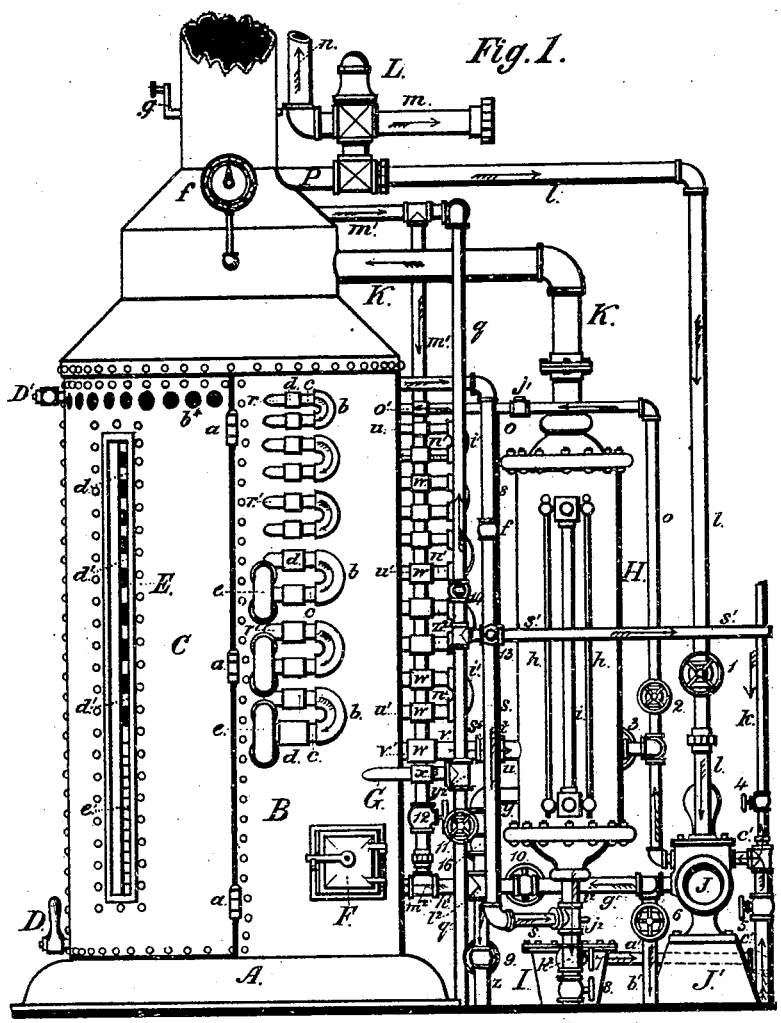
Figure 2:
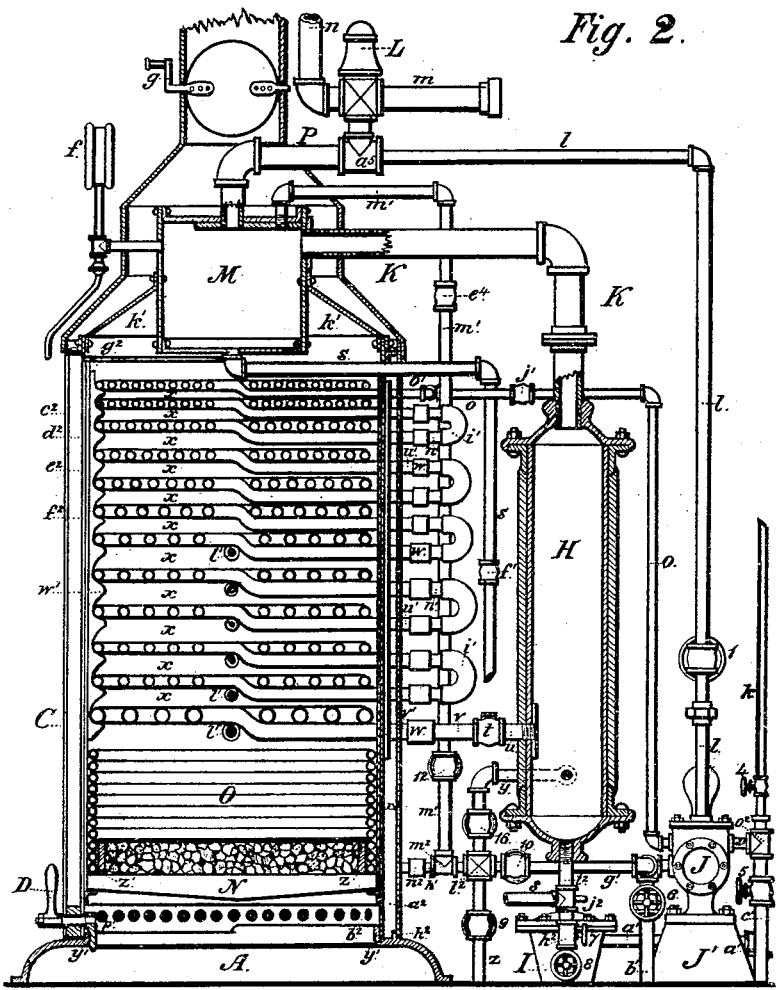

Figure 1 is the right-hand side elevation of a high-pressure gas or gaseous-vapor generator to be used in connection with lime and pottery kilns. Fig. 2 is a vertical central section of the high-pressure gas or gaseous-vapor generator, showing the arrangement of the sectional generators in which the high-pressure gas or gaseous vapor is generated, and the device for forcing the material from which the gas is made into the generator. Fig. 3 is the sectional plan view of the generator and separator into which the high-pressure gas or gaseous vapor is discharged, showing the form and arrangement of one of the conduits, the outer and inner shell surrounding said conduits, and also a plan view of the pump, trap, and connecting-pipes. Fig. 4 is an enlarged broken horizontal section of the shell or casing, showing the space between the outer and inner shells and the arrangement of the doors therewith. Fig. 5 is a vertical sectional view of a limekiln constructed and adapted for burning gaseous fuel when in combination with the high-pressure gas or gaseous-vapor generator shown in Fig. 1. Fig. 6 is a broken sectional elevation of a pottery-kiln, showing the receiving-pipe for conducting and discharging air and gas into the combustion-chamber. This apparatus is to be used in connection with the high-pressure gas or gaseous vapor generator shown in Fig. 1. Fig. 7 is a vertical sectional view of a brick-kiln for burning brick by means of gas or gaseous vapor derived from the high-pressure generator shown in Fig. 1. Fig. 8 is a vertical sectional view of a kiln for burning retorts, sewer and drain pipes, fire-clay settings, and all other articles analogous thereto, by a gas or gaseous vapor generated in a high-pressure generator, a representation of which is shown in Fig. 1.

All corresponding parts are designated by similar signs of reference in each of the figures.

The base A, which is shown in several of the figures, is made preferably of cast-iron, and when of large diameter, or for transportation, it should be made in two or more sections, with suitable flange-connection thereon, which, when put together, are held securely in place by suitable bolt-fastenings.

The stationary portion of the shell B is mounted upon the base A, and firmly secured thereto by bolts or rivets, and when the base is made in sections the shell portion B can be made to conform thereto, and the parts or sections properly secured by any well-known mechanical device or devices. One side or one section of the stationary part of the shell contains the feed-door F of the furnace. The remaining portion of the shell is divided into two doors, C, which swing upon the hinges $a$, and are kept closed by the fastening devices D, D', and $p'$, as shown in Figs. 1 and 2. These devices will hold the upper and lower ends of the doors firmly in place, while the center can be held by a suitable clasp or other device. One of the doors is provided with a window, E, which extends nearly the length of the door. The frame of the window is made preferably of cast metal and riveted to the shell or casing of the door, and is provided with mica or suitable glass covering, through which the interior of the shell and the internal parts thereof are observed. The frames of the doors E are made from suitable angle-iron, either rolled from wrought-iron or made from cast metal. When made from cast metal the pattern can be formed into all of the necessary curvatures, projections, rivet and bolt holes thereto. To this frame the outer and inner casing of metal, $c^2$, $e^2$, is riveted, thus forming a clear space, $x^2$, which extends from the top to the bottom of the body of the generator. The outer casing of metal is provided with apertures $b^4$ at the top, while the inner casing of metal is provided with corresponding apertures, $b^2$, at the bottom thereof. These apertures are for the purpose of admitting the air at the top of the shell into space $x^2$, where it becomes heated on its downward passage, and is drawn through the bottom apertures, $b^2$, into the ash-pit, and thence upward between the grate-bars, where, in its heated condition, it mingles with the fuel and supports the combustion thereof. The draft can be accelerated by a jet of steam or air within the stack, or by suitable connections and devices arranged at the top of the shell, whereby air can be forced in and downward into the ash-pit, and thence upward.

In the broken horizontal sectional view, Fig. 4, it will be observed that at the joint between the two doors C C the frame or angle-iron $w^2$ $w^2$, and also the edge $t^4$ of the inner shell $c^2$, overlaps and covers the joint formed by the frame or angle-irons to which the hinges $a$ are secured. By this arrangement a tight or close joint is obtained. It will also be observed in Figs. 3 and 4 that the doors do not occupy quite one-half of the diameter of the shell, although one-half may be so occupied; but when made as represented in the drawings the stationary portion will be much firmer than if it did not pass the central line. The width of the door is determined by the diameter of the coil or conduits within the shell. The top of the shell or body of the generator is provided with a suitable bonnet and stack thereto.

The interior of the shell is provided with conduits or coils $x$, mounted or supported upon suitable supporting devices, $w'$, as shown in Fig. 2, and upon pipe or tubing $l'$, as shown in sectional view, Fig. 2. These pipes project through the shell, and are connected by return-bend fittings $e$, and in such manner that a free circulation of liquids can be maintained through the series, and as cool liquid is forced through these pipes they cannot become heated to a red heat. Consequently they serve the double purpose of supporting the coils and heating the liquid which may pass through them. These supporting-pipes can continue under each coil or each section of the generator; but, as the heat is not great enough to heat the sections above the fifth or sixth lower ones to a red heat, it is not necessary to continue them above the fifth or sixth coil or conduit; but if, when a gas-flame is employed, the flames should fill the coil chamber or shell, it might be necessary to introduce several more of the supporting-pipes. Those sections which are unsupported by pipes must be kept in position by straps or bars of iron secured to the turns of the coils by clips or other suitable contrivances. The coils or conduits are coiled from pipe which is drawn to the required length, or from short lengths of pipe which are welded at their ends until the required length is obtained. The first or inner turn should be made as small as possible without flattening the pipe. After the section is completed the two ends of the pipe should project tangentially to the inner and outer circle, and parallel, or nearly so, to each other. These projecting ends should be long enough to project through the outer shell and receive suitable fittings thereon. The external projecting end lies within the plane of the coiled section, while the inner end is bent at the commencement of the turn, and after the coil is completed it is heated and bent until it comes in contact with the surface of the coiled section, as shown in Fig. 2, where it will be observed that one-half of the coiled section rests upon said projecting inner ends. The coiled section should be made of pipe of different diameters. The section or sections containing pipe of the largest diameter should be placed at the bottom of the series, while the smallest pipe should be at the top. A good rule to adopt in making these sections would be to allow the space between each turn to equal the internal diameter of the pipe. Thus a good and free flue-space is obtained. The size or diameter of the pipe should be greater or less, or in accordance with the different diameters of the shell, and also the number of the sections should increase with an increased diameter of the said shell.

The superheating-coil O is located in the fire-box for the purpose of gaining additional heating-surface and utilizing heat. The two ends of this coil project through the shell or wall, as shown in Figs. 2 and 3. This coil is shown resting upon the grate-bars. Consequently the complete turns cannot extend below the top of the door, while the remaining turns are provided with return-bends on each side of said door, whereby a continuous circulation is obtained through the entire length of pipe forming the superheater. When gas is to be burned in the furnace in lieu of other fuels the superheating-coil can be coiled in continuous turns until completed, thus avoiding the return-bends, and also the superheating-coil O can be dispensed with and the place now occupied with said coil and fuel can be filled with a suitable number of spiral conduits, which can serve the purpose of a superheater.

In sectional view, Fig. 2, a fire-brick, Z', is shown, which is for the purpose of protecting the bottom of the superheater, and also a lining of asbestus board or of asbestus cement, $f^2$, or other material of an analogous nature, is introduced between the inner casing or shell and the coils or conduits, whereby protection is given to the shell and radiation of heat retarded.

The ends $r'$ of the external turns of the coiled sections shown in Figs. 1 and 3 are connected by right-and-left couplings $d$ and nipples $c$ to return-bends $b$, while the inner ends, $w'$, with the exception of the upper and one or more of the lower ends, are connected by right-and-left couplings $w$ and nipples $n'$ to return-bends $i'$. The end of the upper coil, $o'$, is connected by right-and-left couplings to the pipe $o$, which is provided with a check-valve, $j'$, and valve 2, which controls or regulates the flow of the liquid as it is being forced by the pump into the upper conduit, whence it circulates by force through the entire length of said conduit, and is discharged through the lower end, $v'$, coupling $w$, nipple $v$, check-valve $t$, and nipple $u$ into separator H, wherein the steam, vapor, or gas separates from the condensations or from the liquids which may be discharged therein without evolving into steam, vapor, or gas. The separator is kept free from said liquid matter by the trap I, which forces or discharges the liquid through pipe $a'$ into a device whereby it will be returned to the generator for subsequent evaporation.

The dome M (shown in Fig. 2) is supported by braces $k'$, and is provided with the necessary pipes for conducting away steam, vapor, or gas to places of use.

The safety device L is connected to pipe P by a suitable fitting, and also the safety device is provided with the blow-off pipe $n$ and a pipe, $m$, which can be used for conducting steam, vapor, or gas to a motor or other required place or places. To the T-fitting $a^5$ the pipe $l$ is attached for conducting steam, vapor, or gas to the force-pump J. The flow through the pipe is controlled by valve 1.

$o^2$ is a T-fitting, to which the induction-pipe $c'$ of the pump is connected, valve 5 being the controlling-valve thereto. The T-fitting is connected to the pump by the nipple $d^5$. To the run of the T a small pipe, $k$, is connected for conducting the products of petroleum or liquid combustibles to the pump, the flow of which is controlled by valve 4. Therefore by means of the two induction-pipes $c'$ and $k$ and their valves water and the liquid combustibles can be conducted and drawn into the pump in any proportion required. Thus heating or illuminating gas can be made in the same apparatus at will, or as occasion requires; and also, by closing valve 4, with valve 5 remaining open, steam can be generated for any required purpose.

The pressure of the apparatus is indicated by the gage $f$. The draft to the furnace can be controlled by the damper $g$.

Steam, vapor, or gas is conducted from the dome through pipe $m'$ to the T-fitting $m^2$, which connects to or with the projecting end of the lower turn of the superheater. The flow of the steam, vapor, or gas into said superheater is controlled by valve 12, and the exit therefrom is through pipes $s^5$ and $s'$. These pipes are connected to the superheater by the right-and-left couplings $x^3$, a close nipple, and T-fitting $y^2$. The upper end of the long nipple $s^5$ is provided with a T-fitting, $z^2$. To the outlet of this fitting the discharge-pipe $s'$ is connected. This pipe is provided with a plug-cock, 13, for controlling the outflow of the superheated steam or gas.

To the upper end of the T-fitting $z^2$ the conducting-pipe $q$ is attached, while the other end is connected with pipe $m'$ by means of elbows, nipples, and a T-fitting. The flow in the pipe $q$ is controlled by stop-cock 14, and the purpose whereof is to convert the superheater into a hot-water circulator, or a steam-generator when not employed as a superheater for superheating steam or for the fixing of the gas.

The pipe Y connects the separator with the superheater O by means of nipples, elbows, and a cross-fitting, $l^2$. The flow of the liquid from the separator to the superheater is controlled by valve 16. A blow-off pipe controlled by valve 9 is connected to the cross-fitting $l^2$, which can be employed to drain the superheater, and also other connecting-pipes.

The exhaust-pipe $g'$ connects the exhaust-ports of the engine or motor with the cross-fitting $l^2$, whereby the exhaust from the engine is conducted into and through the superheater. Valve 10 is for the purpose of arresting the flow of the exhaust which passes through the conducting-pipe $b$ on opening valve 6.

The dome M and separator H are connected by pipes $s$ and $i^2$, T's $j^2$ $k^2$, and nipple $i^5$ to the trap I, for the purpose of conducting the condensation and liquid not evolved into steam, vapor, or gas away. The valve 7 is introduced between the trap, dome, and separator for the purpose of stopping the flow of liquid matter when the trap is to be cleaned or any of the parts connected to or with the trap may get out of order. In case this does occur valve 8 can be opened, thereby allowing the trap-liquid to escape to a waste-pipe or to some other place until the repairs are effected.

A glass gage, $i$, with protecting-rods $h$, is attached to the side of the separator H, to determine the height of the liquid in said separator.

In limekiln Fig. 5, the interior L is to be filled with lime-rock through an opening in the dome M', which is covered by the door or cover N'. The wall of the limekiln should be made of suitable refractory material. The wall herein shown is provided with an annular space, $v^4$, which extends from the top to the bottom thereof. The exterior of the inner wall can be provided with a jacket made of iron. The exterior surface of the outer wall can also be provided with a similar jacket, which will give strength and firmness to the structure. An iron cap, $A^2$, which may be made of cast-iron, is placed over the top of the kiln. To this top the dome M' is fitted. A valve, $t^4$, is seated on the ledge $a^4$ in the uptake leading from the dome. This valve will rise and fall in accordance with the pressure in the kiln; and, also, a lever attachment can be affixed to the stem of the valve for the purpose of raising the same when a natural draft is required, which will be the case when the fire is at first started. The air-supply for supporting the combustion is forced through pipe Q', where the current is divided at T-fitting S', (shown in dotted lines,) and from thence the two currents pass upward and are discharged into pipe P', which encircles the kiln. From this pipe the air is discharged through pipes $w^4$ into the annular space $v^4$, and thence downward through said annular space to near the bottom of the kiln; from whence it is discharged through orifices $z^4$ into the interstices formed by the lime-rock while the same is being burned. The air can be blown in at other points; but when economy in fuel is required it is better to arrest the radiated heat by the air-current and utilize the same by transmitting it to the point of combustion, which can be done in the manner as shown.

The lime-rock with which the kiln is charged is burned by a flame produced from gas made in the high-pressure-gas generator shown in Fig. 1. The gas is forced therefrom through pipe $s'$ into an injector, R', from whence it is discharged through pipe Q into the sprayer $b^5$, and thence sprayed out into the combustible liquid $E^2$, into tank $u'$, from whence it is discharged from the chamber $Q^3$ through pipe V', on opening plug-cock Z', into an annular bent pipe, W', from whence it is discharged through a series of small pipes, $y^4$, from thence into tuyeres $x'$. From thence it is discharged into the combustion-chamber or the interstices between the lime rock, where it will mingle with the air-blast, which is forced through a series of holes into said combustion-chamber, thus uniting and generating a heat, the intensity of which can be regulated by the amount of pressure and gas made in the high-pressure generator.

When the products of combustion and carbonic-acid gas which is set free from the lime-rock are to be burned in the kiln the process of burning the same will be as follows: The pipe Q is connected to the dome M' and injector R. The high-pressure gas, which is discharged into and through the injector, draws or exhausts and forces the products of combustion through pipe Q into the tank U', into the sprayer $b^5$, from whence it is sprayed out into the combustible liquid, wherein it becomes carbureted on its passage to the chamber $Q^3$, from whence it is discharged into the limekiln, as above described. The lime, after being burned, is discharged through door $C^5$. The abutment $y'$ supports the superstructure, while the platform T is for the accommodation of the workmen while attending to their duties.

The high-pressure gas or gaseous-vapor generator can be connected by pipe $s'$ directly to the annular pipe $w'$, and from thence the gas or gaseous vapor from the generator can be discharged into the furnace.

A kiln or cupola can be constructed embodying the principles herein shown and described for burning garbage collected in cities and towns.

The pottery-kiln $C^{a'}$ in Fig. 6 is provided with an annular bent pipe, $D^{a'}$, and a series of pipes, $a^9$ and $b^9$, connected thereto. The lower ends of these pipes project through tuyeres $E^{a'}$ $E^{a2}$. These tuyeres connect with the pipe $G^{a'}$. The gaseous vapor is discharged from the generator through pipe $s'$ into the annular bent pipe $D^{a'}$, from whence it is distributed and forced through the series of conducting-pipes $a^9 b^9$, on opening valves 70 71, into the series of tuyeres $E^{a'} E^{a2}$, from whence it is discharged, in connection with the air which is forced from pipe $G^{a'}$ to the said tuyeres, into the combustion-chamber, where heat is generated for the purpose set forth.

The carbureting-tank shown in Fig. 5 can be interposed between the high-pressure generator and the pottery-kiln for the purpose above specified, and also the products of combustion can be conducted from the uptake to the carbureting-tank and therein carbureted, and then forced to the combustion-chamber, as specified in the description of Fig. 5.

The brick-kiln shown in Fig. 7 is divided into chambers $a$ by partition-walls $c$, which can be provided with a suitable number of perforations, $d$, whereby the heat throughout the kiln will be equalized. The perforated arches $b$ are for the purpose of forming chambers $h$ and allowing the gas or flame to be discharged from said chambers through the perforation, and thence through the interstices between the bricks $i$, from whence the products of combustion escape through the apertures $e$ in the top of the kiln.

The high-pressure-gas generator is connected to the brick-kiln by pipe $s'$, which conducts gas or gaseous vapor to the distributing-pipe $g$, from whence the gas is forced through pipe-connection projecting into opening $f$ within chamber $h$. Air is also forced into the same chamber by a suitable pressure blower. (Not shown in the drawings.)

The carbureting device shown in Fig. 5 can be employed in connection with the kiln, as specified in said Fig. 5.

The kiln shown in Fig. 8 is for the purpose of burning retorts $j$, sewer-pipes $k$, tiling $n$, fire-clay settings $m$, drain-pipe $o$, by a flame derived from gas generated in the high-pressure generator shown in Fig. 1. The gas is forced from the generator through pipe $s'$ into the distributing-pipe F, from whence it is discharged through two series of conducting-pipes, $r$ and $q$, which are provided with controlling-valves 30 and 31. The gas is discharged through a series of openings, $p$, in the side of the combustion-chamber B, and through the bottom of said chamber, whereby a general distribution of gas is obtained. Air is forced into said chamber by a suitable pressure-blower. The flame from the gas or products of combustion pass through the perforated bottom F, thence around the retorts, sewer-pipe, &c., up against the perforated arch D, from where the products of combustion are discharged into the uptake. The carbureting device shown in Fig. 5 can be used in connection with the kiln for burning retorts, &c., in the manner described in said Fig. 5, and also the products of combustion can be carbureted and burned in a similar manner.

I reserve to myself the right to claim in future application or applications for Letters Patent all of the patentable matter which cannot be claimed in this application.

What I claim, and desire to secure by Letters Patent, is—

1. The process of burning lime and articles of clay, &c., and utilizing the waste gases thereof, which consists in exhausting the products of combustion from the kiln and forcing them by a jet of gaseous vapor under pressure into a carbureting-chamber, and then enriching the mixture with oil-vapor, and then forcing the carbureted mixture under pressure into a kiln, and there igniting it for burning the lime, whereby the hot products of combustion and gases are circulated through the latter and it is more uniformly burned.

2. A high-pressure-gas generator and a kiln, in combination with an exhauster-pipe, Q, and a carburetor and suitable connecting-pipes, as shown and described.

WM. FRANK BROWNE.

Witnesses:
R. SYLVANI,
E. A. LEGRAND.